(12) United States Patent
Liu et al.

(10) Patent No.: US 9,503,561 B2
(45) Date of Patent: *Nov. 22, 2016

(54) PEN-BASED CONTENT TRANSFER SYSTEM AND METHOD THEREOF

(71) Applicant: QUALCOMM Incorporated, San Dieog, CA (US)

(72) Inventors: Eric Liu, Santa Clara, CA (US); Stefan J. Marti, Santa Clara, CA (US); Seung Wook Kim, Cupertino, CA (US); Alison Wong, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/980,128

(22) Filed: Dec. 28, 2015

(65) Prior Publication Data

US 2016/0134738 A1 May 12, 2016

Related U.S. Application Data

(63) Continuation of application No. 13/267,161, filed on Oct. 6, 2011, now Pat. No. 9,265,074.

(51) Int. Cl.
*G06F 15/16* (2006.01)
*H04M 1/725* (2006.01)
(Continued)

(52) U.S. Cl.
CPC ........... *H04M 1/7253* (2013.01); *H04W 4/008* (2013.01); *H04W 76/02* (2013.01); *H04W 84/18* (2013.01)

(58) Field of Classification Search
CPC ..... H04W 76/02; H04W 64/00; H04W 8/24; H04W 4/02; H04W 48/16; H04W 72/042; H04W 72/0446; H04W 76/023; H04W 12/10; H04W 4/003; G06F 3/03545; G06F 3/0488; G06F 3/0386
See application file for complete search history.

(56) References Cited

U.S. PATENT DOCUMENTS 5,845,282 A * 12/1998 Alley ................... G06F 3/03545
6,002,387 A   12/1999 Ronkka et al.
(Continued)

FOREIGN PATENT DOCUMENTS

WO    WO-2008048167 A1    4/2008

OTHER PUBLICATIONS

Haller, M., et al.: "Shared Design Space; Sketching ideas Using Digital Pens and a Large Augmented Tabletop Setup"; 2006; 12 pages.

(Continued)

*Primary Examiner* — Djenane Bayard
(74) *Attorney, Agent, or Firm* — Norton Rose Fulbright US LLP (57) ABSTRACT

Embodiments of the present invention disclose a system and method for providing pen-based content transfer between mobile computing devices. According to one embodiment, a first mobile computing device and second mobile computing device are configured to host electronic content. A pen device is operated by a user for selecting preferred electronic content from the electronic content hosted on the first computing device. Furthermore, the pen device is configured to store transfer information for facilitating transmission of the preferred electronic content from the first mobile computing device to the electronic content of the second mobile computing device based on action from the user.

19 Claims, 6 Drawing Sheets

(51) Int. Cl.
*H04W 76/02* (2009.01)
*H04W 4/00* (2009.01)
*H04W 84/18* (2009.01)

(56) References Cited

U.S. PATENT DOCUMENTS

| | | | |
|---|---|---|---|
| 6,563,494 B1* | 5/2003 | Eichstaedt | G06F 3/0481 |
| | | | 345/179 |
| 6,933,919 B1 | 8/2005 | Anderson et al. | |
| 2005/0099399 A1 | 5/2005 | Chang | |
| 2006/0192772 A1 | 8/2006 | Kambayashi | |
| 2007/0162636 A1 | 7/2007 | Henry | |
| 2007/0247445 A1* | 10/2007 | Lynggaard | G06F 3/0317 |
| | | | 345/179 |
| 2008/0018619 A1 | 1/2008 | Slatter et al. | |
| 2009/0054108 A1 | 2/2009 | Kito | |
| 2009/0128520 A1 | 5/2009 | Combe | |
| 2010/0138743 A1 | 6/2010 | Chou | |
| 2010/0221999 A1 | 9/2010 | Braun et al. | |
| 2013/0091238 A1 | 4/2013 | Liu et al. | |

OTHER PUBLICATIONS

Rekimoto, J.; "A Multiple Device Approach for Supporting Whiteboard-based Interactions"; Sony Computer Science Laboratory, Inc.; 8 pages.

Rekimoto, J.; "Pick-and-Drop: a Direct Manipulation Technique for Multiple Computer Environments"; Sony Computer Science Laboratory, Inc.: 8 pages.

* cited by examiner

PEN-BASED CONTENT TRANSFER SYSTEM AND METHOD THEREOF

CROSS-REFERENCE TO RELATED APPLICATIONS

This application is a continuation of co-pending, commonly assigned, U.S. patent application Ser. No. 13/267,161 filed Oct. 6, 2011 entitled PEN-BASED CONTENT TRANSFER SYSTEM AND METHOD THEREOF, the disclosure of which is hereby incorporated herein by reference.

BACKGROUND

The emergence and popularity of mobile computing has made portable electronic devices, due to their compact design and light weight, a staple in today's marketplace. Moreover, providing efficient and intuitive interaction between devices and users thereof is essential for delivering an engaging and enjoyable user-experience. For example, stylus or pen-based input systems provide a natural user interface for computing systems by enabling a specific point on a touch-enabled display screen to be selected or identified when the user physically touches the display with a pointing device or pen stylus. When multiple portable electronic devices are in use, however, transferring data or content between these devices can be complex and inefficient. For example, selection of the data can often require numerous steps including clipping artwork from the first device, saving the file documents, locating the desired file, and then finding a suitable method for transferring the desired file to the second device in a proper and file format.

BRIEF DESCRIPTION OF THE DRAWINGS

The features and advantages of the inventions as well as additional features and advantages thereof will be more clearly understood hereinafter as a result of a detailed description of particular embodiments of the invention when taken in conjunction with the following drawings in which.

DETAILED DESCRIPTION OF THE INVENTION

The following discussion is directed to various embodiments. Although one or more of these embodiments may be discussed in detail, the embodiments disclosed should not be interpreted, or otherwise used, as limiting the scope of the disclosure, including the claims. In addition, one skilled in the art will understand that the following description has broad application, and the discussion of any embodiment is meant only to be an example of that embodiment, and not intended to intimate that the scope of the disclosure, including the claims, is limited to that embodiment. Furthermore, as used herein, the designators "A", "B" and "N" particularly with respect to the reference numerals in the drawings, indicate that a number of the particular feature so designated can be included with examples of the present disclosure. The designators can represent the same or different numbers of the particular features.

The figures herein follow a numbering convention in which the first digit or digits correspond to the drawing figure number and the remaining digits identify an element or component in the drawing. Similar elements or components between different figures may be identified by the user of similar digits. For example, 143 may reference element "43" in FIG. 1, and a similar element may be referenced as 243 in FIG. 2. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Prior solutions include web-based services such as Evernote™ and Dropbox™. These solutions allow for users to easily transfer content across web-connected devices through applications that are synced to a remote server. Another solution for data transfer between devices is the use of Universal Serial Bus (USB) flash drives. However, this solution is optimum only for entire files rather than clips or portions of data. In addition, a vast majority of mobile computing devices (i.e., tablet computers and smartphones) do not include support for a USB host (i.e., no port), which is required for the utilization of USB drives. As such there is a need in the art for permitting transfer of electronic content between devices using a simplified pen-based selection and input process, and in some cases, absent network access.

Examples of the present invention provide a system and method for selection and transfer of electronic content between devices using a pen device. In accordance with one example, a first mobile computing device and second mobile computing device host transferable and adaptable electronic content. A user operates a pen device for selecting object data or preferred content from one of the mobile computing devices. In addition, the pen device is further configured to store and transfer information used to facilitate transmission of the selected object data between the mobile computing devices.

Figure 1:
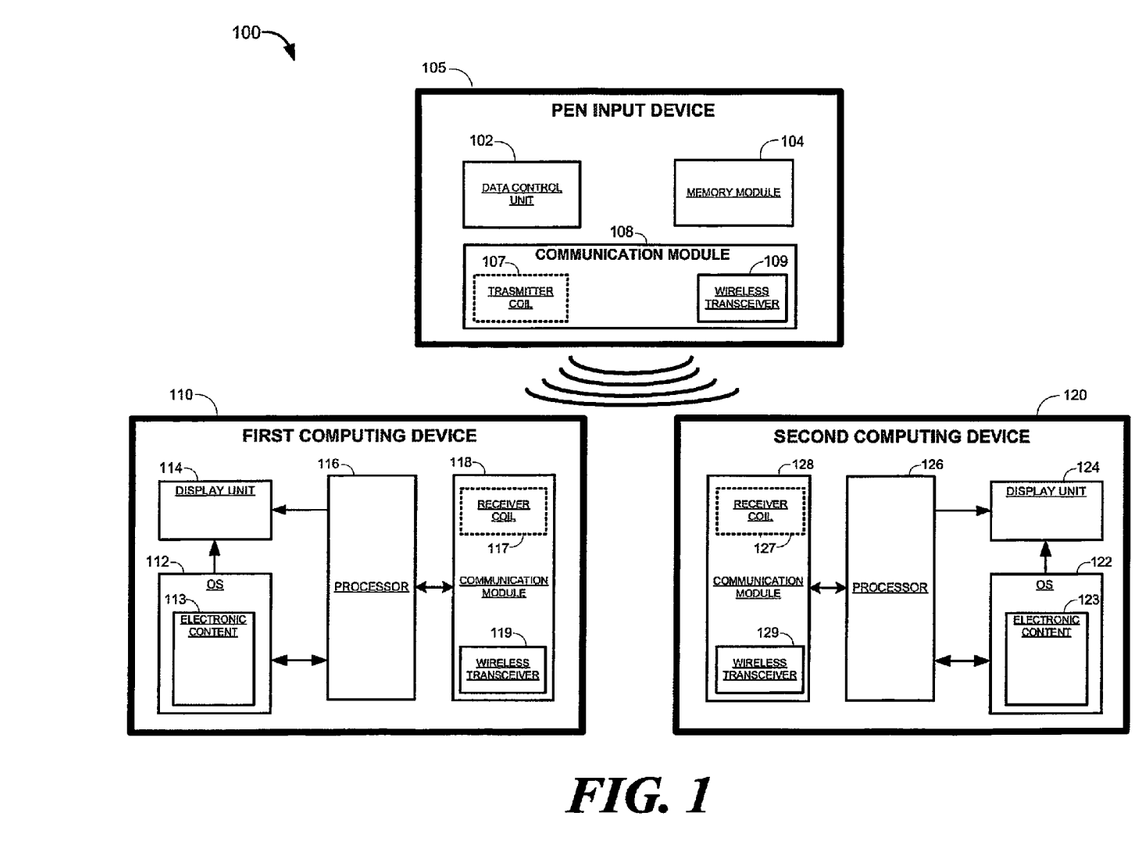
FIG. 1 is a simplified block diagram of a pen-based input system for providing content transfer between multiple computing devices according to an example of the present invention.

Referring now in more detail to the drawings in which like numerals identify corresponding parts throughout the views, FIG. 1 is a simplified block diagram of a pen-based input system for providing content transfer between multiple computing devices according to an example of the present invention. As shown here, the system 100 includes a pen device 105 and multiple mobile computing devices 110 and 120. Each mobile computing device 110 and 120 includes a processor 116 and 126 coupled to a display unit 114 and 124, a mobile operating system 112 and 122, and a communication module 118 and 128. In one example embodiment, processor 116 and 126 represents a central processing unit (CPU), microcontroller, microprocessor, or logic configured to execute programming instructions associated with mobile computing device 110 and 120 respectively. The display units 114 and 124 represent an electronic visual display configured to display images and graphics for viewing by an operating user. According to one example embodiment, the display unit is a touch-enabled display so as register and process physical contact (i.e., user input) on a surface of the display unit. Mobile operating systems 112 and 122 are configured to execute and run software applications and host electronic content 113 and 123. As used herein, electronic content represents digital content or media such as word processing documents, online content, digital images, or any other form of electronic content capable of being stored on a storage medium and edited by an operating user. The mobile operating system may also include a graphical user interface for enabling input interaction between an operating user and the mobile device 110. In addition, mobile devices 110 and 120 include communication modules 118 and 128 for enabling data transmission between devices 105, 110, and 120. Each communication module 118 and 128 may include a wireless transceiver 119 and 129 for enabling wireless data transmission between devices using wireless communication protocols such as Bluetooth® and Wi-Fi®. According to one example, each mobile computing device 110 and 120 may include a receiver coil 117 and 127 respectively, configured to form a magnetic field with the transmitter coil 107 of the pen device 105 for facilitating near field communication (NFC) and data transfer.

Pen device 105, which may resemble a pen stylus or wand for example, includes a data control unit 102, a memory module 104, and a communication module 108. In one example, data control unit 102 represents a central processing unit configured to control the action of other internal components and the flow of data. Furthermore, memory module 104 is used to store desired electronic content and/or transfer information received from a first computing device for subsequent transmission to a second mobile computing device. The communication module 108 may include a wireless transceiver 109 for establishing communication with a mobile computing device 110 or 120. Additionally, communication module 108 may include a transmitter coil 107 such as a radio frequency (RF) or near-field communication (NFC) magnetic coil formed within the pen device 105. Under such configuration, when the pen device 105 physically touches or is placed in close proximity to one of the mobile computing devices 110 or 120, a magnetic field is formed so as trigger a transfer initiation event as will be described in more detail with reference to the figures below. Alternatively, pen device 105 may communicate with the mobile devices 110 and 120 through various channels such as infrared, capacitive, inductive, or ultrasound for example.

Figure 2A:
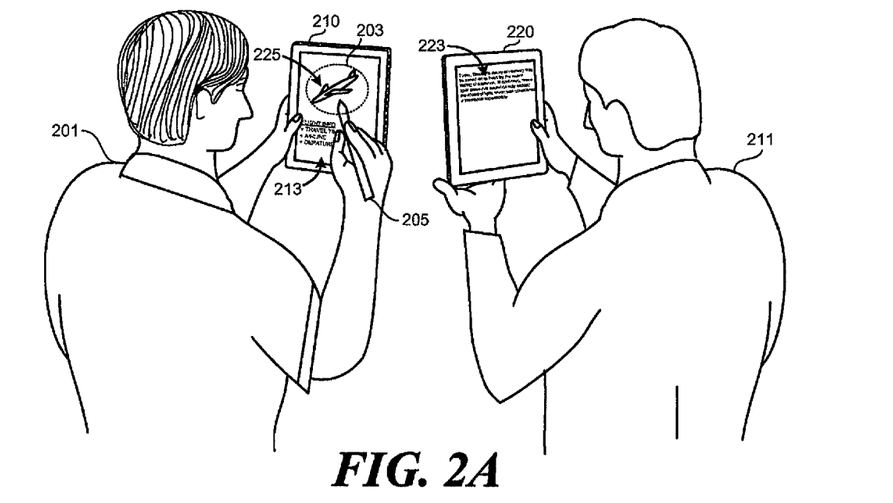
FIGS. 2A and 2B are three-dimensional perspective views of an operating environment and method for pen-based data transfer according to an example of the present invention.
Figure 2B:
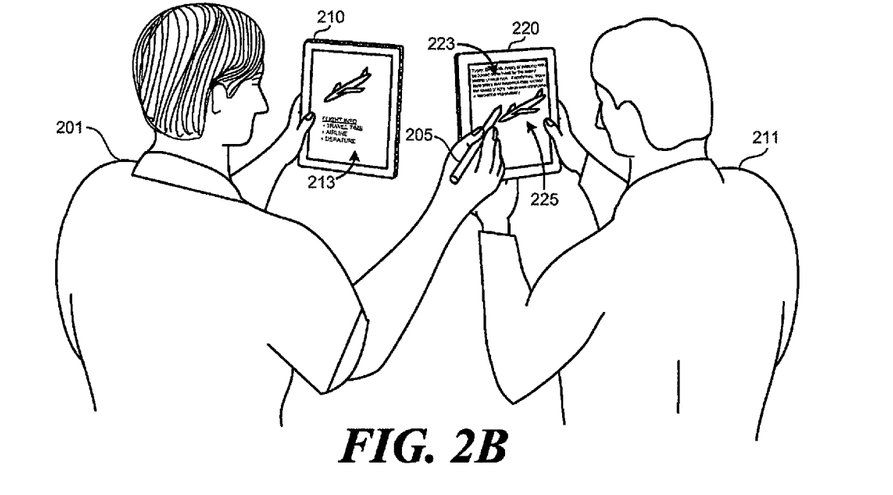

FIGS. 2A and 2B are three-dimensional perspective views of an operating environment and method for pen-based data transfer according to an example of the present invention. In the present example, multiples users 201 and 211 operate mobile computing devices 210 and 220 respectively, with each device hosting electronic content 213 and 223. As shown in the example of FIG. 2A, the operating user 201 initiates a transfer or selection event and selects a portion/snippet (i.e., preferred object data 225) of the electronic content 213 using a pen device 205. According to one example embodiment, the operating user 201 may initiate a selection event by pressing a dedicated button or by navigating the pen device's user interface to enter into a selection mode. Thereupon, the operating user 201 may then identify a selection area 203 of the display or electronic content 213 by drawing around the desired object or electronic content.

In one example, content selection can also be accomplished by tapping or double tapping a particular displayed object. Still further, content selection may be triggered by squeezing and releasing the pen device 205 over a desired object using a pressure sensor built into the pen device 205 so as to mimic an eyedropper tool.

FIG. 2B depicts an operating environment in which a user transfers preferred electronic content onto a second mobile computing device. The operating user 201 may trigger/initiate a transfer or "release" event for indicating to the data control unit of the pen device that the user desires to transfer content to a second device. In a manner similar to activation of the selection event, the release event may be triggered by pressing a dedicated button or by navigating the pen device's user interface to enter into an output or release mode. Similarly, the release event may also be activated by the user squeezing (via a built-in pressure sensor) the pen device 205 while positioned over a target location within the electronic content 223 hosted on the second mobile computing device 210. After initiating the release event, the operating user 201 may physically contact the display of the second mobile computing device 220 using the pen device 205 and indicate a destination position for insertion of the selected object data (preferred electronic content 225). If the preferred electronic content 225 is an image, the content 225 may then be inserted at the identified location within the electronic content 223 so as to cause the displayed electronic content 223 to adapt to the inserted content 225. For example, insertion of the selected image 225 into the middle of a paragraph (adaptable electronic content) displayed on the second device may cause the processing unit or application program of the second mobile device to split said paragraph and accommodate space for the inserted object rather than have the object simply overlay the text.

Moreover, pen-based gestures may be used for initiating and facilitating transfer of the electronic content. For example, an operating user may draw an oval for initiating a selection event and a rectangle for triggering a release or "paste" event. Additionally, several pen gestures may be used to group multiple portions of electronic content for transfer. For example, an operating user may first select a group of objects by making a group gesture (e.g., group circle), and then release or drop the object group on a second device using a similar gesture. In addition, the graphical user interface of the mobile computing device may cause the visualization of the preferred electronic content to be "sucked" into the pen device in order to make the selection event more intuitive and graphically pleasing. Likewise, the preferred electronic content may stream or "pour" out onto the display of the second computing device such that the entire "pick and drop" transfer operation mimics a medical syringe for example, thereby providing an engaging visual representation of said transfer method.

Figure 3:
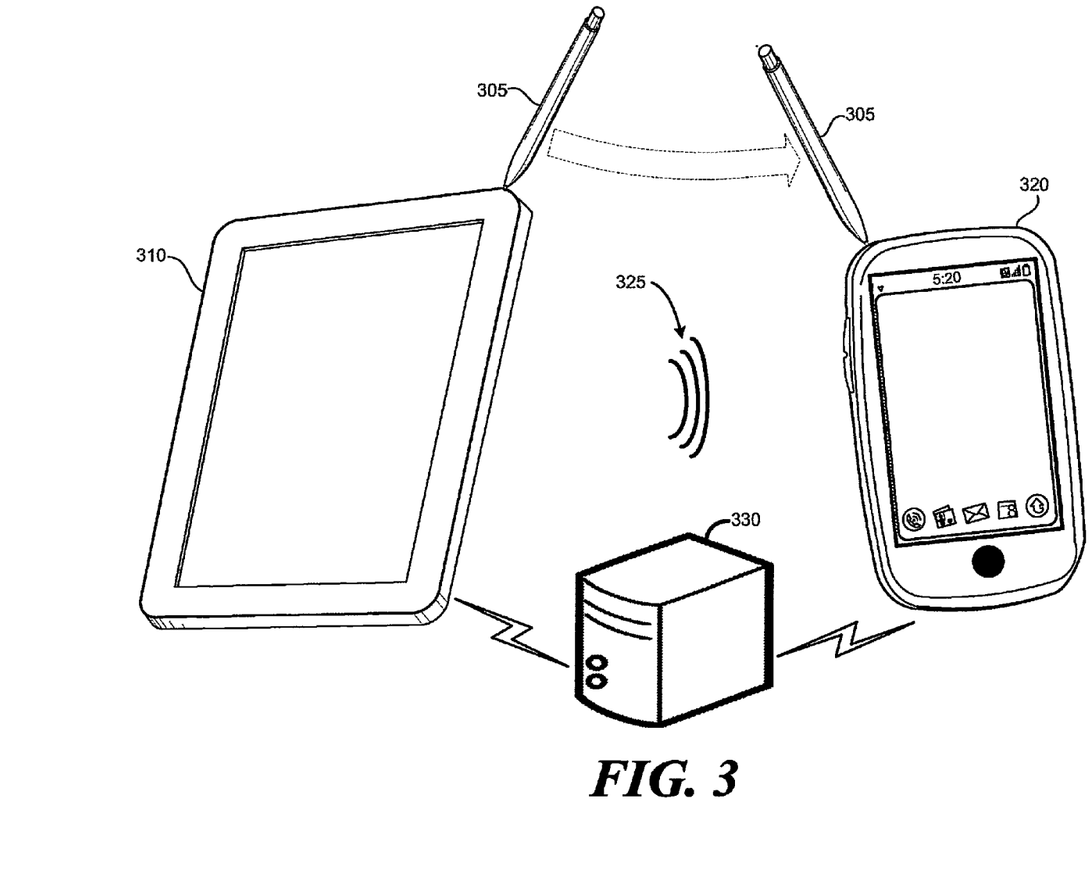
FIG. 3 is an illustration of another pen-based content transfer method between mobile computing devices in accordance with an example of the present invention.

FIG. 3 is an illustration of another pen-based content transfer method using mobile computing devices in accordance with an example of the present invention. As shown here, the system 300 includes a pen device 305 interacting with multiple mobile computing devices 310 and 320. A selection event may be triggered by a tap of the of the pen device 305 on the housing or outer surface of the mobile computing device 310. In the present example, NFC or a similar short-range wireless communication protocol can be used to identify that the pen device has came into contact (or near contact) with the mobile device. As a result and in accordance with one example, the processing unit of the mobile computing device 310 intelligently converts the displayed electronic content to index data, which may be a combination of image data and metadata associated with the specific file or webpage currently being displayed. The mobile computing device 310 may then submit the index data along with connection information to the pen device. The directional arrow of FIG. 3 represents movement of the pen device 305 from the first computing device 310 to physical contact with the second computing device. According to one example, such contact serves to initiate a release event with the second computing device 320 and cause the pen device 305 to transfers the index data and connection information used to establish direct communication (via Bluetooth™ or Wi-Fi™ pairing) with the first mobile computing device 310. As a result, the second mobile computing device 320 may then retrieve the object data or preferred electronic content directly from the first mobile computing device via the received index data.

Alternatively, the selection event may cause the first mobile computing device 310 to upload the displayed electronic content (e.g., item, text, or object) to a dedicated host server 330 while also passing along a uniform resource locator (URL) to the pen device 305 for locating the uploaded electronic content. In a similar fashion, initiation of the release event will cause the pen device 305 to transmit the URL information to the second mobile computing device 320 for retrieving the electronic content from the dedicated host server 330. Accordingly, transfer of electronic content between devices can occur even if the mobile computing devices do not include touch-enabled displays.

Figure 4:
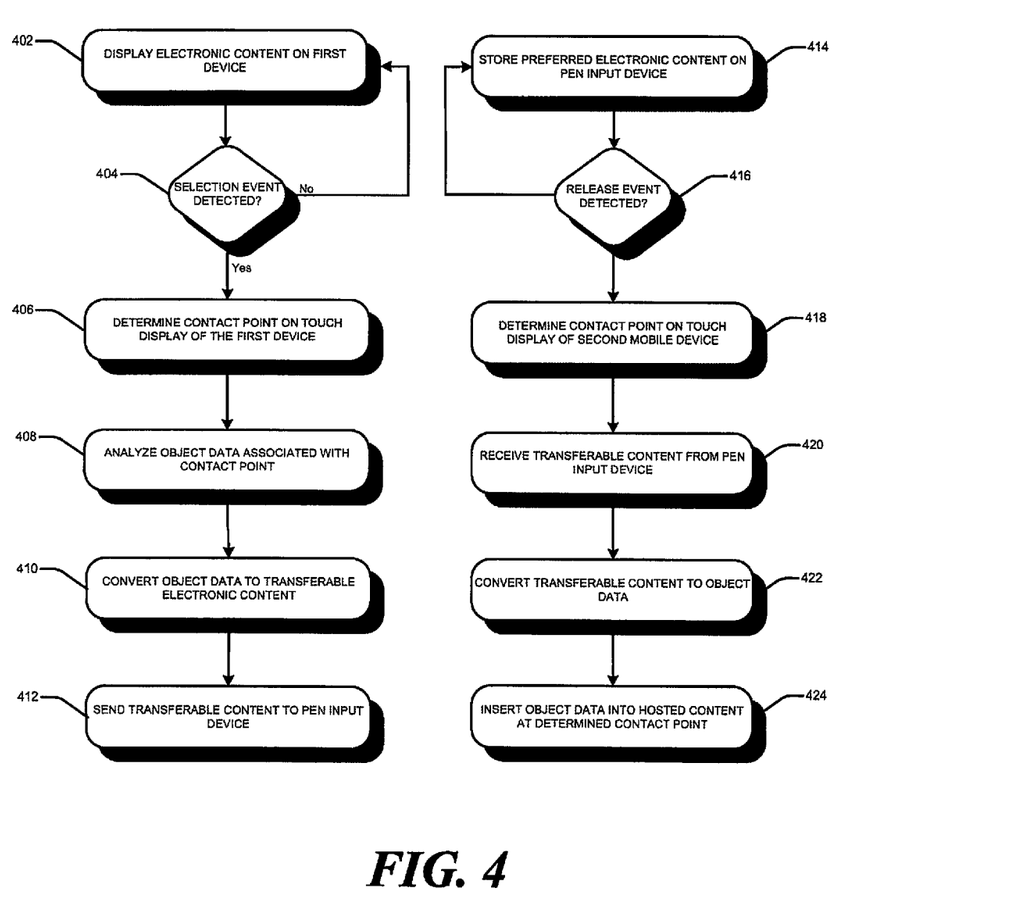
FIG. 4 is a simplified flow chart of the processing steps for providing a method of pen-based content transfer between mobile computing devices according to an example of the present invention.

FIG. 4 is a simplified flow chart of the processing steps for providing a method of pen-based content transfer between mobile computing devices according to an example of the present invention. In step 402, the first mobile computing device displays transferable electronic content and object data for selection by an operating user. Upon detection, in step 404, of a selection event, which may represent a physical contact of the pen device on the touch-enabled surface of the computing device, the processing unit then determines a target location associated with the pen contact on the display of the first mobile computing device in step 406. Next, in step 408, object data or electronic content associated the contact point is then analyzed by the processing unit of the first mobile computing device in identifying target data or content. Thereupon, in step 410 the identified data content is converted into transferable electronic content by the processing unit, and in step 412, the transferrable electronic content is sent to the pen device via one of the aforementioned wireless communication protocols.

According to one example embodiment, in step 414 the preferred transferable electronic content is stored on the pen device until a release event is initiated by the operating user in step 416. As discussed above, a release event may be triggered by the physical contact of the pen device on a second mobile computing device, or through depression of an interface button on the pen device. The release event is to be associated with a second mobile computing device hosting editable or adaptable electronic content (i.e. capable of inserting additional data content therein). In a similar fashion as the first computing device, detection of a release event in step 416 causes the processing unit of the second mobile computing device to determine a target location associated with the pen contact on the touch-enabled display of the device in step 418. Thereafter, in step 420, the stored transferrable electronic content is transmitted by the pen device and eventually received at the processing unit of the second mobile device. The received transferable electronic content may be converted to object data if necessary in step 422, and then inserted into the adaptable electronic content hosted on the second mobile computing device in step 424.

Figure 5:
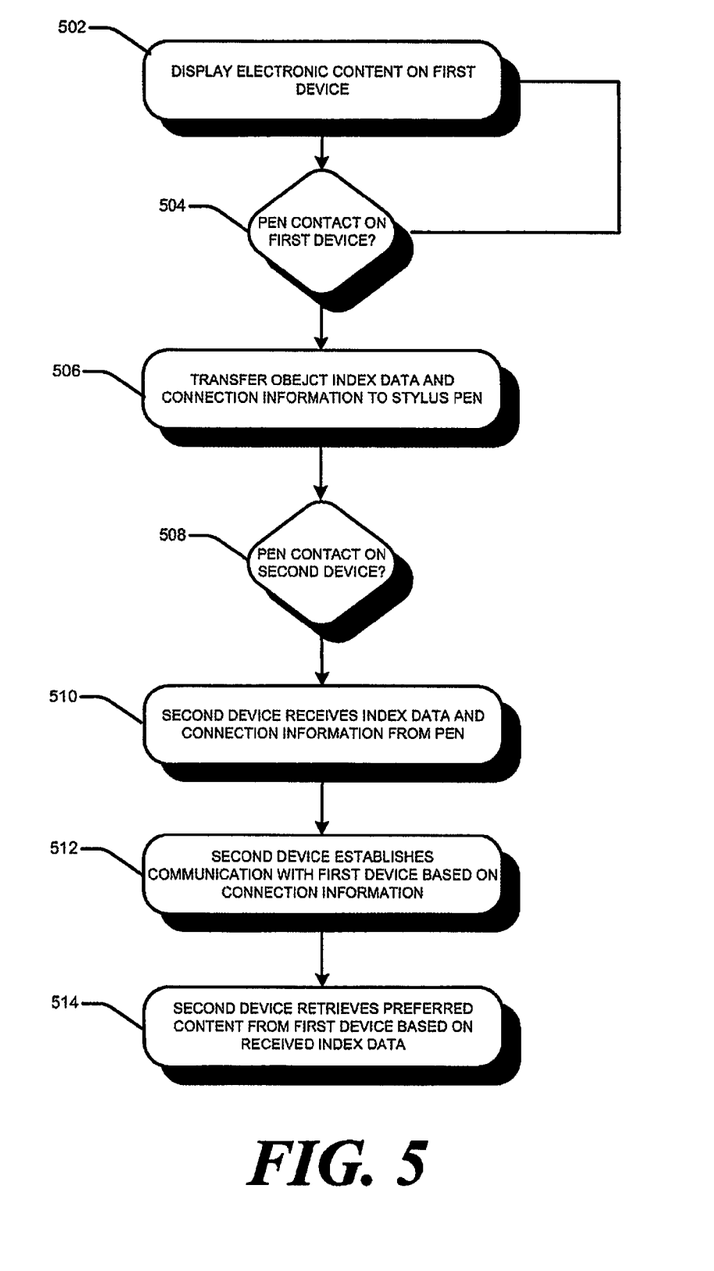
FIG. 5 is a simplified flow chart of the processing steps for providing another method of pen-based content transfer between mobile computing devices according to an example of the present invention.

FIG. 5 is a simplified flow chart of the processing steps for providing another method of pen-based content transfer between mobile computing devices according to an example of the present invention. In step 502, object data and electronic content are displayed on a first mobile computing device. Upon detecting physical contact of the pen device on a surface of the first computing device in step 504, then in step 506, the first mobile computing device transfers index data and connection information to the pen stylus. As expressed above, the transferred index data represents a combination of text/image data and metadata associated with a specific file or webpage currently displayed on the first mobile computing device (i.e., desired content), while the transferred connection information represents data necessary to pair and establish direct wireless communication (e.g., Bluetooth™ or Wi-Fi™ pairing) between the first mobile computing device and the second mobile computing device. The index data and connection information is stored within memory of the pen device until a release event, or physical contact of the pen device with the second mobile computing device, is detected in step 508. In response thereto, in step 510 the pen device transmits the index data and connection information to the second mobile computing device. As a result, the second mobile computing device may utilize the connection information to pair and establish communication with the first mobile computing device in step 512. Thereupon, the second mobile computing device uses the received index data to retrieve the desired electronic content from the first mobile computing device in step 514 so that the desired content may be displayed on the second mobile computing device.

Figure 6:
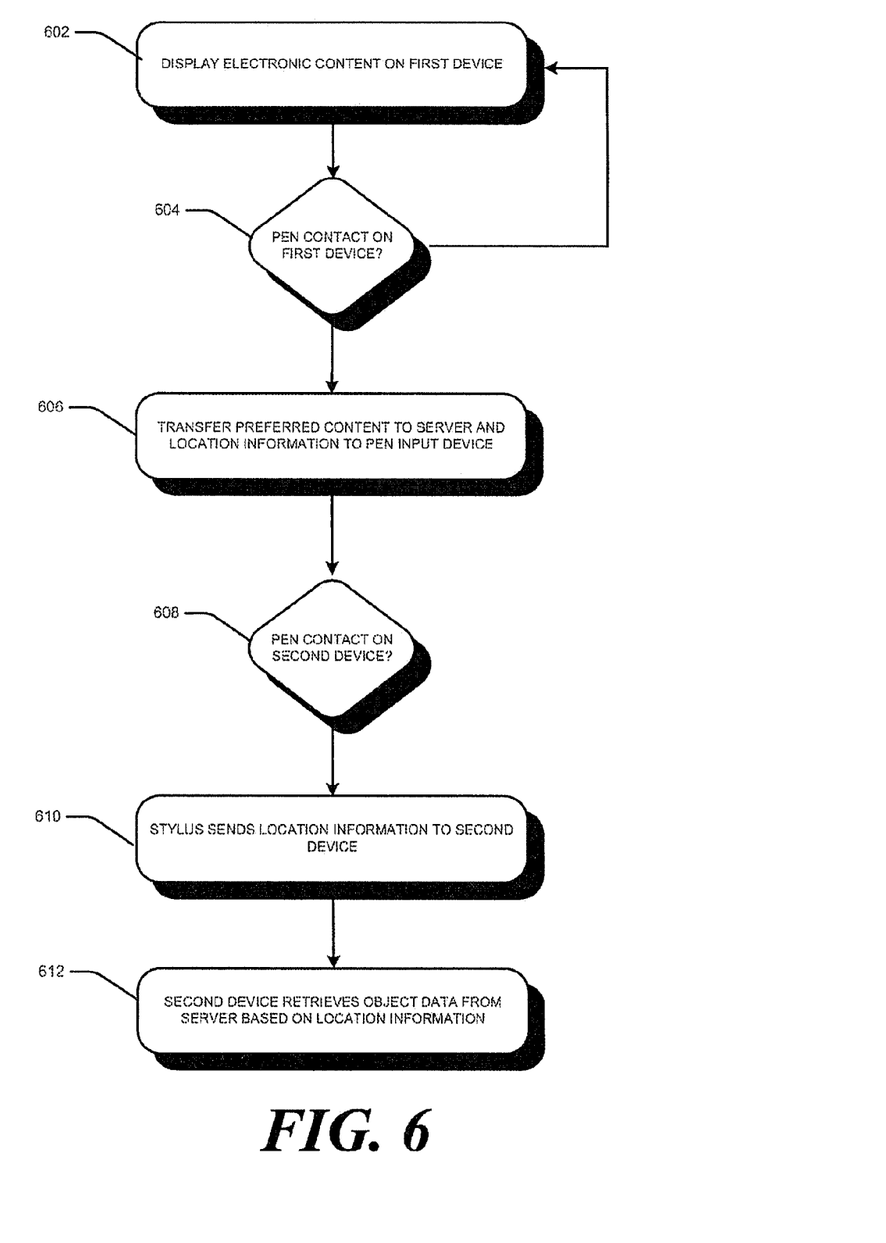
FIG. 6 is a simplified flow chart of the processing steps for providing yet another method of pen-based content transfer between mobile computing devices according to an example of the present invention.

FIG. 6 is a simplified flow chart of the processing steps for providing yet another method of pen-based content transfer between mobile computing devices according to an example of the present invention. In step 602, transferable electronic content and object data are displayed on the first mobile computing device. Upon detecting physical contact of the pen device on a surface of the first computing device in step 604, then in step 606, the first mobile computing device transfers the desired or displayed electronic content to a dedicated host server, and content location information to the pen device. According to one example, the content resource information represents a uniform resource locator (URL) associated with dedicated host server and the transferrable electronic content stored thereon. The content resource information is stored within memory of the pen device until a release event, or physical contact of the pen device with the second mobile computing device, is detected in step 608. In response thereto, in step 610, the pen device transmits the content resource information to the second mobile computing device. Similarly to the previous example embodiment, in step 614, the second mobile computing device uses the content resource information to retrieve the transferable electronic content from the dedicated host server for display on the second mobile computing device.

Examples of the present invention provide a system and method for pen-based content transfer amongst a plurality of mobile computing devices. Moreover, several advantages are afforded by the configuration of the present examples. For instance, the pen device has the advantage of being able to visually select particular content/objects on the screen irrespective of the content's data format. More particularly, the pen device may be used to circle anything that can then be converted into a screenshot thus providing a visual selection mechanism that greatly simplifies the user experience. Furthermore, the pen device may communicate with the mobile devices wirelessly and therefore does not require a wired data port. In prior solutions, wireless data transfer is often complicated and laborious due to the necessity of syncing the source and target devices coupled with the large number of steps required to select and save the target data. However, examples of the present invention utilize a pen device for quick data selection and also as a physical indicator of where the data is "contained", thereby making the entire transfer experience more intuitive and simplified for the operating user.

Furthermore, while the invention has been described with respect to exemplary embodiments, one skilled in the art will recognize that numerous modifications are possible. For example, although exemplary embodiments depict a tablet personal computer as the mobile computing device, the invention is not limited thereto. For example, the first and/or second mobile computing device may be a netbook, smartphone, cell phone, digital audio player, gaming console, or any other portable electronic device configured to interact with a pen device.

Furthermore, the pen-based content transfer may be accomplished with more than two mobile devices. For example, physical contact of the pen device on a third or fourth mobile device may serve to transfer the stored electronic content thereto. Furthermore, the writing tool may be formed in any shape or size conducive to handwriting input by an operating user rather than the pen-shaped device depicted in the present examples. For example, the writing tool may be the size and shape of a highlighter, crayon, pencil, brush, or similar writing utensil. Thus, although the invention has been described with respect to exemplary embodiments, it will be appreciated that the invention is intended to cover all modifications and equivalents within the scope of the following claims.

What is claimed is:

1. An electronic content transfer system, the system comprising:
   a pen device configured to:
      receive, from a first mobile computing device, data location information that specifies a location where a portion of electronic content from transferable electronic content of the first mobile computing device is stored;
      receive, from the first mobile computing device, connection information that represents data used to establish communication between the first mobile computing device and a second mobile computing device configured to host adaptable electronic content; and
      initiate communication between the first mobile computing device and the second mobile computing device based on the connection information, wherein the second mobile computing device communicates with the first mobile computing device to retrieve the portion of electronic content from the first mobile computing device for use with the adaptable electronic content.

2. The system of claim 1, wherein the pen device is configured to transmit the portion of electronic content to the second mobile computing device via a short-range wireless communication protocol.

3. The system of claim 1, wherein, based upon contact of the pen device on the first mobile computing device, the pen device is configured to receive data location information in the form of index data associated with the portion of electronic content and the connection information from the first mobile computing device.

4. The system of claim 3, wherein the pen device is configured to transmit the index data and the connection information for permitting communication between the first mobile computing device and the second mobile computing device such that the portion of electronic content may be transferred directly between the first mobile computing device and the second mobile computing device based on the index data.

5. The system of claim 1, wherein, based upon contact of the pen device on first mobile computing device, the pen device is configured to receive data location information in the form of resource location information from the first mobile computing device.

6. The system of claim 5, wherein the pen device is configured to transmit the resource location information to the second mobile computing device so as to permit the second mobile computing device to access the portion of electronic content from a host server.

7. A method for transferring electronic content, the method comprising:
   receiving, from a first mobile device hosting transferrable electronic content, data location information that specifies a location where a portion of electronic content of the transferrable electronic content is stored;
   receiving, from the first mobile device, connection information that represents data used to establish communication between the first mobile device and a second mobile device hosting adaptable electronic content; and
   transmitting, to the second mobile device, the connection information to establish communication between the second mobile device and the first mobile device based on the connection information, wherein the second mobile device communicates with the first mobile device to retrieve the portion of electronic content from the first mobile device for use with the adaptable electronic content.

8. The method of claim 7, further comprising:
   determining a contact point of a pen device on a touch-enabled display of the first mobile device.

9. The method of claim 8, further comprising:
   analyzing object data associated with the contact point; and
   converting the object data to the portion of electronic content to be transferred to the pen device.

10. The method of claim 7, further comprising:
    determining a contact point of a pen device on a touch-enabled display of the second mobile device; and
    inserting the portion of electronic content into the adaptable electronic content of the second mobile device at the determined contact point.

11. A method for transferring electronic content, the method comprising:
    receiving, from a first mobile computing device hosting transferrable electronic content, connection information that represents data used to establish communication between the first mobile computing device and a second mobile computing device hosting adaptable electronic content; and
    transmitting, via a pen device, the connection information to the second mobile computing device in response to physical contact between the pen device and the second mobile computing device, wherein a portion of electronic content is retrieved by the second mobile computing device from the first mobile computing device based on communication between the first mobile computing device and the second mobile computing device established based on the connection information.

12. The method of claim 11, further comprising:
receiving, via the pen device, object index data and the connection information from the first mobile computing device.

13. The method of claim 12, further comprising transmitting, via the pen device, the object index data to the second mobile computing device to cause the second mobile computing device to communicate directly with the first mobile computing device based on the connection information and retrieve the portion of electronic content from the first mobile computing device based on the object index data.

14. The method of claim 11, further comprising:
receiving, via the pen device, resource location information from the first mobile computing device.

15. The method of claim 14, further comprising transmitting, via the pen device, the resource location information to the second mobile computing device so as to permit the second mobile computing device to access the portion of electronic content from a host server.

16. An electronic content transfer apparatus, the apparatus comprising:
means for receiving, from a first mobile device hosting transferrable electronic content, data location information that specifies a location where a portion of electronic content of the transferrable electronic content is stored;
means for receiving, from the first mobile device, connection information that represents data used to establish communication between the first mobile device and a second mobile device hosting adaptable electronic content; and
means for transmitting, to the second mobile device, the connection information to establish communication between the second mobile device and the first mobile device based on the connection information, wherein the second mobile device communicates with the first mobile device to retrieve the portion of electronic content from the first mobile device for use with the adaptable electronic content.

17. The apparatus of claim 16, further comprising:
means for determining a contact point of a pen device on a touch-enabled display of the first mobile device.

18. The apparatus of claim 17, further comprising:
means for analyzing object data associated with the contact point; and
means for converting the object data to the portion of electronic content to be transferred to the pen device.

19. The apparatus of claim 16, further comprising:
means for determining a contact point of a pen device on a touch-enabled display of the second mobile device; and
means for inserting the portion of electronic content into the adaptable electronic content of the second mobile device at the determined contact point.

* * * * *